(12) United States Patent
Xu et al.

(10) Patent No.: US 8,793,663 B2
(45) Date of Patent: Jul. 29, 2014

(54) SMART CACHE FOR A SERVER TEST ENVIRONMENT IN AN APPLICATION DEVELOPMENT TOOL

(75) Inventors: Li Xu, Cary, NC (US); Jianjun Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/982,587

(22) Filed: Dec. 30, 2010

(65) Prior Publication Data

US 2012/0174078 A1 Jul. 5, 2012

(51) Int. Cl.
*G06F 9/44* (2006.01)
(52) U.S. Cl.
USPC .......................................... 717/131; 717/106
(58) Field of Classification Search
USPC .......................................................... 717/131
See application file for complete search history.

(56) References Cited

U.S. PATENT DOCUMENTS

| 8,359,574 B1* | 1/2013 | Bannur et al. ................. 717/120 |
| 2006/0122971 A1* | 6/2006 | Berg et al. .......................... 707/3 |
| 2010/0125826 A1* | 5/2010 | Rice et al. ....................... 717/107 |
| 2011/0138361 A1* | 6/2011 | McEntee et al. ............... 717/125 |
| 2011/0154287 A1* | 6/2011 | Mukkamala et al. .......... 717/105 |

OTHER PUBLICATIONS

Hadlock, Server-Side Caching for AJAX, informIT (Feb. 2, 2007) retrieved from http://www.informit.com/articles/printerfriendly.aspx?p=690694 on Nov. 15, 2013.*
Fernandez, et al., "Optimizing Web Services Performance Using Caching," Int. Conf. on Next Generation Web Services Practices, IEEE, 2005.

* cited by examiner

*Primary Examiner* — Don Wong
*Assistant Examiner* — Theodore Hebert
(74) *Attorney, Agent, or Firm* — Steven M. Greenberg, Esq.; CRGO Law

(57) ABSTRACT

Embodiments of the present invention provide a method, system and computer program product for a smart cache for server testing in an application development tool. In an embodiment of the invention, method of smart caching of service data during application testing in a development tool for a service invoking application is provided. The method includes loading source code for a computer program into a development tool executing in memory of a computing system. The method further includes executing the source code from the development tool. In this regard, the execution of the source code invokes a service responsive to a directive to invoke the service disposed in the source code. Finally, the method includes invoking the service in a container instance in response to a first invocation of the service from the computer program. However, a data set for the service is located in a cache and returned the data set to the computer program in lieu of invoking the service in the container instance for all other invocations of the service.

13 Claims, 1 Drawing Sheet

SMART CACHE FOR A SERVER TEST ENVIRONMENT IN AN APPLICATION DEVELOPMENT TOOL

BACKGROUND OF THE INVENTION

1. Field of the Invention

The present invention relates to software application testing and more particularly to data retrieval during software application testing.

2. Description of the Related Art

The art of software development extends far beyond a mere coding of a functional specification for a computer program. Modern software development conforms to a lifecycle which begins with the functional specification leading into the formulation of a suitable architecture for an application implementing the functional specification. The lifecycle continues with the physical coding of the application and includes iterative testing and modification cycles to ensure the integrity of the code. Finally, the execution of the completed code can be analyzed to facilitate the further revision of the code to improve the performance of the code.

Traditional testing of a computer program during development can include the external monitoring of the integrity of the program and the performance of the program, either subjectively based upon end user impression, or objectively based upon independently acquired metrics. In the latter circumstance, the integrity of the program can include the simulation of user interaction with the user interface of the program to ensure the proper operation of the program logic. Likewise, the performance of the program can include an internal monitoring of the code through software test tooling as is known in the art. Further, the proper handling and management of data consumed in an application can be ensured as can the appropriate display and functionality of user interface elements for the computer program.

More particularly, given the modern complexity of the graphical user interface to a computer program, testing also includes the iterative process of coding the user interface, executing the program, modifying the user interface to account for display imperfections, and the re-execution of the program to determine whether or not the imperfections in the user interface have resolved. Of note, when testing the user interface in an advanced markup language development application such as the asynchronous Javascript and extensible markup language (AJAX) application, complications can arise due to the nature of the AJAX grouping of technologies.

Specifically, AJAX is a group of interrelated Web development methods used on the client-side of a client-server application to create interactive Web applications. With AJAX, Web applications can retrieve data from the server asynchronously in the background without interfering with the display and behavior of the existing Web page. Data is usually retrieved using the "XMLHttpRequest" object. Of note, AJAX uses a combination of hypertext markup language (HTML) and content style sheets (CSS) to mark up and style information. Additionally, a document object model (DOM) for the data of the page can be accessed with Javascript to dynamically display, and to allow the user to interact with, the information presented. Javascript and the XMLHttpRequest object provide a method for exchanging data asynchronously between browser and server to avoid full page reloads.

During development of the user interface of an AJAX application, it is required during unit testing and testing of the user interface to constantly re-render the page providing the user interface. For every re-rendering operation, services invoked from the page by way of AJAX must be re-invoked over and over again. For quick responding services over wide bandwidth, the latency associated with the repeated service invocation during testing will be of little consequence. However, for services invoked in the page that in turn launch complex database queries, return large data sets, or execute slowly or consume bandwidth in a bandwidth limited environment, the resulting latency can be problematic. To address this problem, some developers tend to place the data retrieved from the service calls in a flat file and re-code the application under test to refer to the flat file—however to do so requires the developer to modify that application code, often in multiple places.

BRIEF SUMMARY OF THE INVENTION

Embodiments of the present invention address deficiencies of the art in respect to application testing of remote service invoking applications and provide a novel and non-obvious method, system and computer program product for a smart cache for server testing in an application development tool. In an embodiment of the invention, method of smart caching of service data during application testing in a development tool for a service invoking application is provided. The method includes loading source code for a computer program into a development tool executing in memory of a computing system. The method further includes executing the source code from the development tool. In this regard, the execution of the source code invokes a service responsive to a directive to invoke the service disposed in the source code. Finally, the method includes invoking the service in a container instance in response to a first invocation of the service from the computer program. However, a data set for the service is located in a cache and returned the data set to the computer program in lieu of invoking the service in the container instance for all other invocations of the service.

In one aspect of the embodiment, it can be determined whether or not a smart cache module has been activated in the container instance. If so, the service in the container instance is invoked in response to a first invocation of the service from the computer program, but otherwise the data set for the service is located in the cache and returning to the computer program in lieu of invoking the service in the container instance. However, if the smart cache module has not been activated, the service in the container instance is invoked in response to all invocations of the service from the computer program. Optionally, the smart cache module can be activated manually, or in response to determining that a threshold response time has been exceeded for prior invocations of the service in the container instance.

In another embodiment of the invention, a software development data processing system is provided. The system includes a computing system with memory and at least one processor and a development tool executing in the memory of the computing system. A container instance such as an application server also executes in the memory of the computing system and a service executes in the container instance. A cache can be coupled to the container instance and a smart cache module can execute in the memory of the computing system. Notably, the module can include program code enable to invoke the service in the container instance in response to a first invocation of the service from a computer program executing from source code loaded in the development tool such as source code incorporating AJAX technology, but otherwise to locate a data set for the service in the cache and return the data set to the computer program in lieu of invoking the service in the container instance.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for smart caching of service data during application testing in a development tool for a service invoking application. In accordance with an embodiment of the invention, a markup language defined user interface to a computer program loaded in a development tool can invoke upon execution in the development tool a service executing in an server instance coupled to the development tool. Data returned by the service in the server instance to the computer program can be placed in a cache coupled to the development tool. Subsequent invocations of the service resulting from correspondingly subsequent executions of the computer program can result in the data in the cache being returned to the computer program in lieu of invoking the service. Consequently, the computer program can be repeatedly executed during a testing cycle without incurring the performance penalty of repeatedly invoking the service in the server instance.

Figure 1:
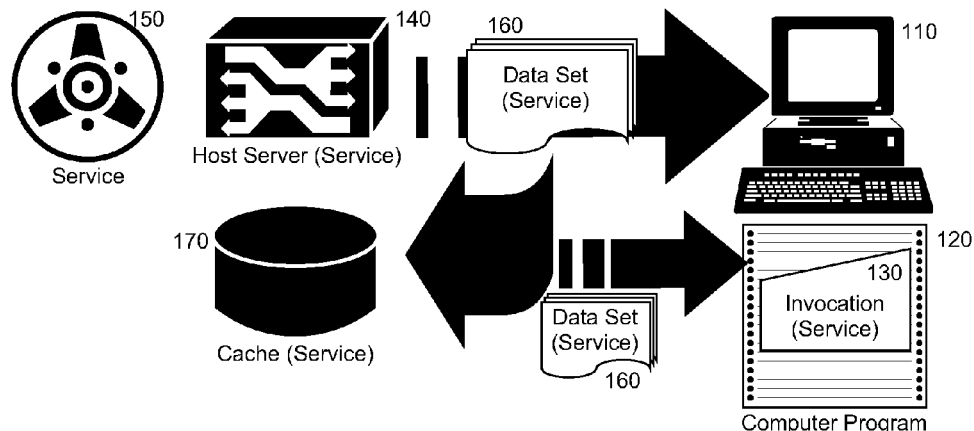
FIG. 1 is a pictorial illustration of a process for smart caching of service data during application testing in a development tool for a service invoking application.

In further illustration, FIG. 1 pictorially shows a process for smart caching of service data during application testing in a development tool for a service invoking application. As shown in FIG. 1, an application development tool 110 can load for development and testing a computer program 120, such as an AJAX application in which one or more different service invocations 130 are disposed. Each service invocation 130 can refer to a corresponding service 150 executing in a container of a host server 140, such as an application server.

The host server 140 can include activatable smart caching logic that, once activated can respond to an initial service invocation of the service 150 by invoking the service 150, retrieving a resultant data set 160 and returning the data set 160 to the computer program 120 while storing the data set 160 in a cache 170. However, upon subsequent invocations of the service 150 from the computer program 120, the data set 160 in the cache 170 can be returned to the computer program 120 in lieu of invoking the service 150. In this way, the repeated execution of the computer program 120 need not result in the repeated invocation of the service 150. Instead, during development of the computer program 120 in the development tool 110, the smart caching logic of the host server 140 can be activated to simulate the invocation of the service 150 by returning the data set 160 from the cache 170 to the computer program 120.

Figure 2:
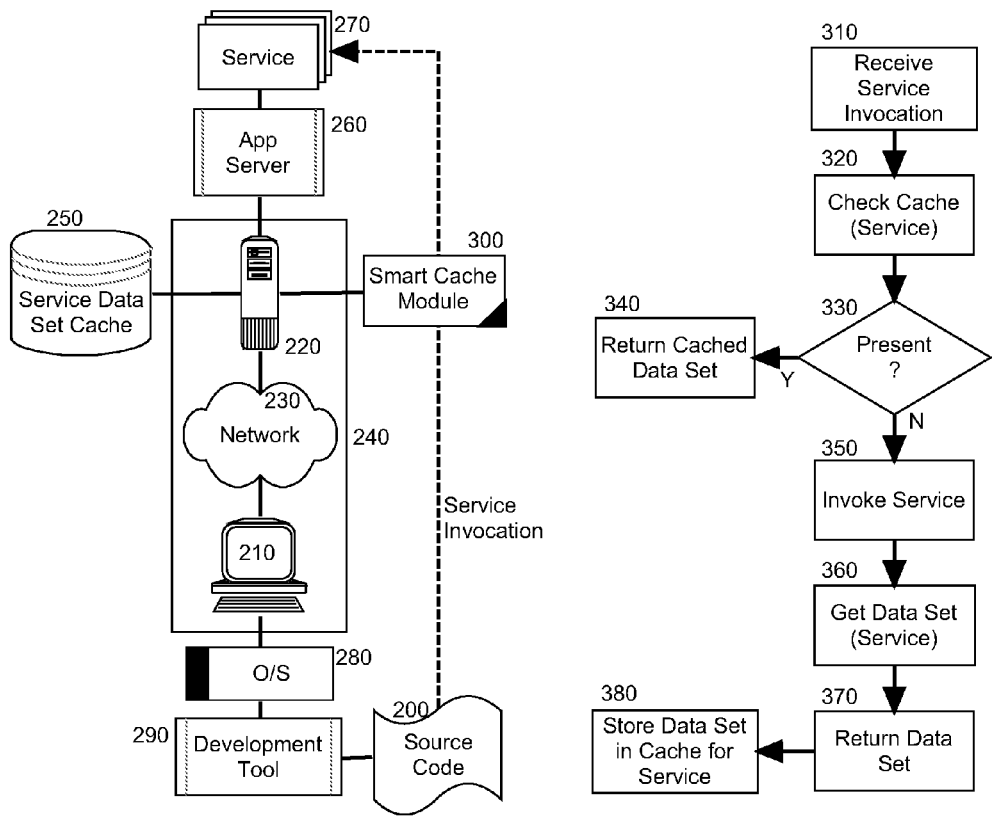
FIG. 2 is a schematic illustration of a software development data processing system configured for smart caching of service data during application testing in a development tool for a service invoking application; and, FIG. 3 is a flow chart illustrating a process for smart caching of service data during application testing in a development tool for a service invoking application.

The process described in connection with FIG. 1 can be implemented within a software development data processing system. In yet further illustration, FIG. 2 schematically depicts a software development data processing system configured for smart caching of service data during application testing in a development tool for a service invoking application. The system can include a computing system 240 that can include either a single computing device with at least one processor and memory, or a client computer 210 with at least one processor and memory coupled over a computer communications network 230 to a server computer 220 with at least one processor and memory.

The computing system 240 can support the execution of an operating system 280 that in turn can host the operation of a software development tool 290 providing a development environment for developing source code 200 and testing the source code 200 through iterative executions of the source code 200. The computing system 240 also can include a container instance 260 for componentized logic such as an application server. The container instance 260 in turn can support the operation of multiple different services 270. In this regard, the source code 200 can incorporate AJAX technology and, thus, can include at least one service invocation referencing one of the services 270 accessible through the container instance 260.

Of note, a smart cache module 300 can be coupled to the server computer 220 and a service data set cache 250 in the memory of the computing system 240, and the smart cache module 300 can execute in the memory of the computing system 240. In this regard, the smart cache module 300 can be activated through the container instance 260. The activation of the module 300 can occur manually as directed by an end user in the container instance 260, or the activation of the module 300 can occur programmatically in response to a response time between service invocation and response from the invoked service exceeding a threshold value.

Once activated, program code of the module 300 can be enabled to respond to a first invocation of one of the services 270 from the source code 200 under test in the development tool 290 by invoking the invoked one of the services 270 and returning a resultant data set to the development tool 290. Additionally, the program code of the module 300 can be enabled to store the resultant data set in a service data set cache 250 in association with the service. Thereafter, the program code of the module 300 can be enabled to respond to the repeated invocation of the invoked one of the services 270 during testing by returning the data set from the service data set cache 250 instead of invoking the invoked one of the services 270.

Upon de-activation of the smart cache module 300 the program code can be enabled to delete all entries from the service data set cache 250 and upon removal of the container instance 260, the service data set cache 250 itself can be deleted. However, in response to a shutdown of the development tool 290, the service data set cache 250 can be persisted to fixed storage in the computing system 240. Once the development tool 290 can been restarted, the service data set cache 250 can be restored to the memory of the computing system 240.

Figure 3:
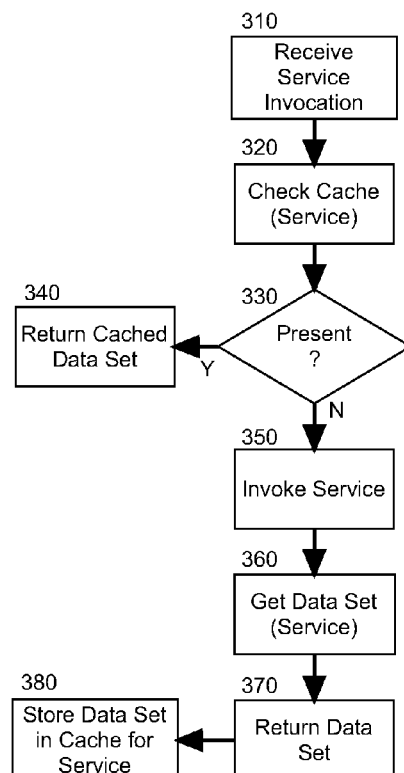

In even yet further illustration of the operation of the smart cache module 300, FIG. 3 is a flow chart illustrating a process for smart caching of service data during application testing in a development tool for a service invoking application. Beginning in block 310, a service invocation can be received from the execution of a computer program under test in a development tool. In block 320, a cache can be consulted to determine if a data set for the invoked service has been stored in the cache. In decision block 330, if the data set for the invoked service can be found in the cache, in block 340 the data set can be returned to the computer program executing in the development tool. Otherwise, in decision block 330 if the data set for the invoked service cannot be found in the cache, in block 350 the service can be invoked and in block 360 a data set resulting from the service invocation can be retrieved from the service. In block 370 the retrieved data set can be returned to the computer program under test in the development tool. Finally, in block 380 the data set can be stored in the cache in association with the invoked service.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A method of smart caching of service data during application testing in a development tool for a service invoking application, the method comprising:
    loading source code for a computer program into a development tool executing in memory of a client computing system;
    executing the source code from the development tool, the execution of the source code invoking a service responsive to a directive to invoke the service disposed in the source code;
    invoking the service in a container instance of a host server coupled to the client computing system over a communications network in response to a first invocation of the service from the computer program and returning a resultant data set for the service to the computer program:
        storing the resultant data set in a cache in the host server; and
        returning the stored resultant data set to the computer program in lieu of invoking the service in the container instance in response to a second or any subsequent invocation of the service from the computer program;
    wherein the resultant data set for the service is stored in the cache in the host server after the first invocation;
    persisting the resultant data set for the service in a fixed storage of the host server in response to a shutdown of the development tool; and,
    restoring the resultant data set for the service to memory of the host server upon the development tool being restarted.

2. The method of claim 1, wherein invoking the service in the container instance of the host server in response to the first invocation of the service from the computer program and returning the resultant data set for the service to the computer program, further comprises:
    determining whether or not a smart cache module has been activated in the container instance;
    if the smart cache module has been activated, invoking the service in the container instance in response to the first invocation of the service from the computer program and returning the resultant data set for the service to the computer program; and,
    if the smart cache module has not been activated, invoking the service in the container instance in response to the second or any subsequent invocation of the service from the computer program.

3. The method of claim 2, further comprising activating the smart cache module in response to determining that a threshold response time has been exceeded for prior invocations of the service in the container instance.

4. The method of claim 2, further comprising deleting all entries in the cache in response to a de-activation of the smart cache module.

5. The method of claim 2, further comprising deleting the cache in response to the shutdown of the development tool.

6. A software development data processing system comprising:
    a client computing system comprising memory and at least one processor;
    a development tool executing in the memory of the client computing system;
    a container instance executing in memory of a host server computing system coupled to the client computing system over a communications network;
    a service executing in the container instance;
    a cache coupled to the container instance for storing a resultant data set for the service after a first invocation of the service; and,
    a smart cache module executing in the memory of the host server computing system, the module comprising program code enable to invoke the service in the container instance in response to the first invocation of the service from a computer program executing from source code loaded in the development tool and return a resultant data set for the service to the computer program;
    store the resultant data set in the cache;
    return the stored resultant data set to the computer program in lieu of invoking the service in the container instance in response to a second or any subsequent invocation of the service from the computer program;
    persist the resultant data set for the service in a fixed storage of the host server computing system in response to a shutdown of the development tool; and,
    restore the resultant data set for the service to the memory of the host server computing system upon the development tool being restarted.

7. The system of claim 6, wherein the container instance is an application server.

8. The system of claim 6, wherein the source code incorporates asynchronous Javascript and extensible markup language (AJAX) technology.

9. A computer program product for smart caching of service data during application testing in a development tool for a service invoking application, the computer program product comprising:
    a computer readable storage medium having computer readable program code embodied therewith, the computer readable program code comprising:
    computer readable program code for loading source code for a computer program into a development tool executing in memory of a client computing system;

computer readable program code for executing the source code from the development tool, the execution of the source code invoking a service responsive to a directive to invoke the service disposed in the source code;

computer readable program code for invoking the service in a container instance of a host server coupled to the client computing system over a communications network in response to a first invocation of the service from the computer program and returning a resultant data set for the service to the computer program computer readable program code for storing the resultant data set in a cache in the host server; and computer readable program code for returning the stored resultant data set to the computer program in lieu of invoking the service in the container instance in response to a second or any subsequent invocation of the service from the computer program;

wherein the resultant data set for the service is stored in the cache in the host server after the first invocation;

computer readable program code for persisting the resultant data set for the service in a fixed storage of the host server in response to a shutdown of the development tool; and, computer readable program code restoring the resultant data set for the service to memory of the host server upon the development tool being restarted.

10. The computer program product of claim 9, wherein the computer readable program code for invoking the service in the container instance in response to the first invocation of the service from the computer program and returning the resultant data set for the service to the computer program further comprises:

computer readable program code for determining whether or not a smart cache module has been activated in the container instance;

computer readable program code for, if the smart cache module has been activated, invoking the service in the container instance in response to the first invocation of the service from the computer program and returning the resultant data set for the service; and, computer readable program code for, if the smart cache module has not been activated, invoking the service in the container instance in response to the second or any subsequent invocation of the service from the computer program.

11. The computer program product of claim 10, further comprising computer readable program code for activating the smart cache module in response to determining that a threshold response time has been exceeded for prior invocations of the service in the container instance.

12. The computer program product of claim 10, further comprising computer readable program code for deleting all entries in the cache in response to a de-activation of the smart cache module.

13. The computer program product of claim 10, further comprising computer readable program code for deleting the cache in response to the shutdown of the development tool.

* * * * *